Dec. 20, 1966  O. H. LINDEMANN  3,292,576
APPARATUS FOR DIP COATING
Filed Aug. 6, 1963
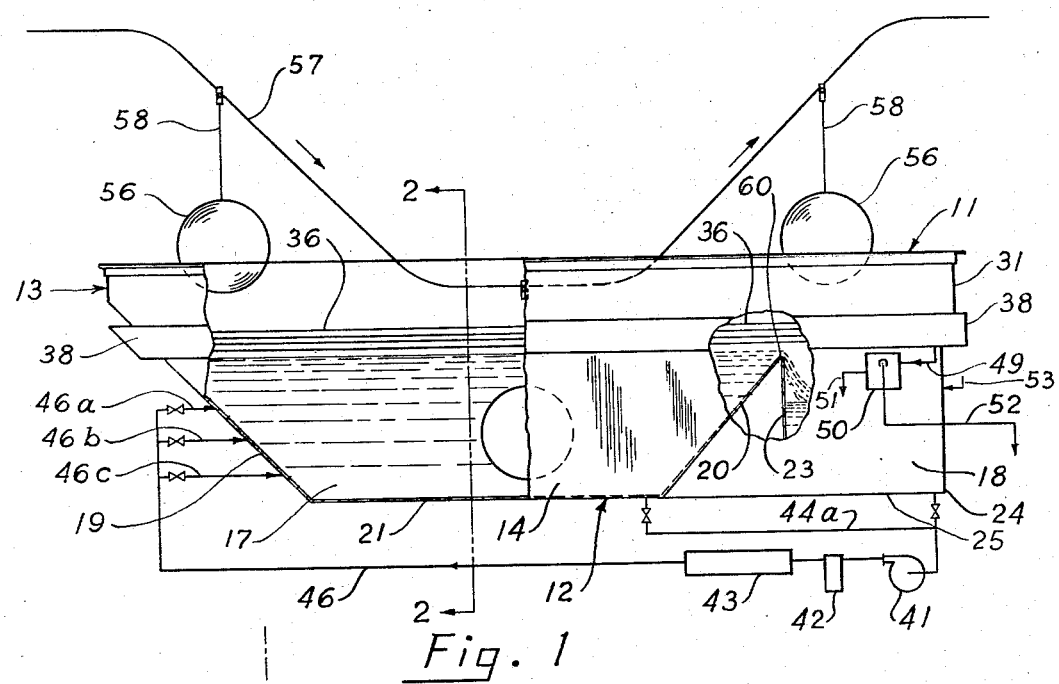
Fig. 1
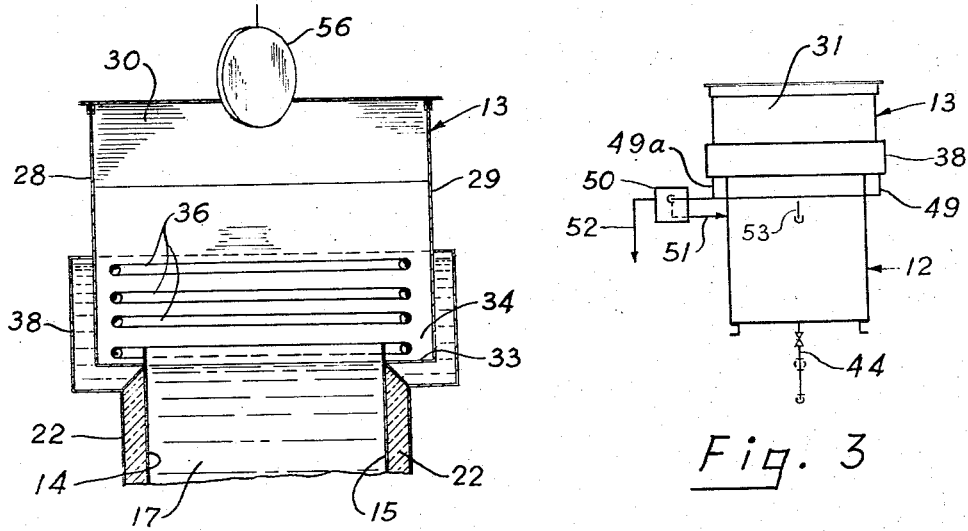
Fig. 2
Fig. 3

United States Patent Office 3,292,576
Patented Dec. 20, 1966

3,292,576
APPARATUS FOR DIP COATING
Otto H. Lindemann, Buffalo, N.Y., assignor to Hooker Chemical Corporation, Niagara Falls, N.Y., a corporation of New York
Filed Aug. 6, 1963, Ser. No. 300,321
5 Claims. (Cl. 118—429)

This invention relates to apparatus for dip coating and is particularly concerned with improved apparatus for use in dip coating procedures in which the coating composition employed is maintained at an elevated temperature.

In recent years hot dip coating has come into wide use as a method for providing, on various types of objects, coatings that are of even thickness and are free from drips. In this procedure, the hot coating composition, which contains a substantial amount of a volatile substantially non-flammable solvent, preferably a halogenated one, such as trichloroethylene, perchloroethylene, carbon tetrachloride or the like, is supplied to a dip tank which has cooling members adjacent the upper surface of the coating composition and along one or more sides of the tank. These members are supposed to condense the solvent vapors which result from evaporation of solvent from the surface of the composition, as well as the solvent vapor formed by flash volatilization of solvent when articles being coated are withdrawn from the bath of coating composition. However, in many cases, the condensation is not complete or the condensate re-evaporates before it is removed from the dip tank. Such inefficiency in removing solvent vapors from the space above the coating composition in the dip tank and in keeping it out of such space may retard solvent evaporation from a dipped object and is likely to result in loss of solvent vapor from the tank.

It is an object of the present invention to provide improved apparatus of the character described that will prevent any substantial escape of solvent vapor from a dip tank.

Another object of the invention is to provide improved apparatus of the character described that will be more efficient in dip coating of articles.

Another object of the invention is to provide a dip tank for coating which is so designed and constructed as to minimize re-evaporation of condensed solvent.

A further object of the invention is to provide improved apparatus of the character described that may be used with compositions of various types.

Other objects and advantages of the present invention will be apparent from the following description thereof taken in conjunction with the accompanying drawings in which:

FIGURE 1 is a longitudinal view, partly in section, of coating apparatus embodying the improvements of the present invention;

FIGURE 2 is an enlarged, transverse sectional view taken on line 2—2, with a part of the dip tank removed; and FIGURE 3 is an end view of the apparatus illustrated in FIGURE 1.

Referring to FIGURE 1, the numeral 11 designates, broadly or generally, an elongated, rectangular coating apparatus which comprises a lower tank portion 12, adapted to contain a liquid coating bath, and an upper portion or enclosure 13 which contains solvent vapor condensation and recovery means.

Arranged longitudinally in the tank portion 12 and enclosed between the side walls 14 and 15 thereof, are a dip tank 17 and a juxtaposed sump or overflow tank 18. The dip tank 17 has end walls 19 and 20 which slope inwardly to a flat bottom 21, while the overflow tank or sump 18 comprises end walls 23 and 24, the upper end of the former being joined to the upper end of the sloping wall 20 of the dip tank 17, and a bottom 25. The walls 14 and 15 where they enclose the dip tank 17 and the end walls 19, 20 and bottom 21 of the dip tank are preferably insulated as shown at 22 in FIGURE 2 with insulation of any desired, suitable type.

The enclosure 13 is substantially rectangular and includes side walls 28 and 29 and end walls 30 and 31, which surround and are spaced outwardly from the top of the tank portion 12. The bottom edges of the walls of the enclosure 13 are joined to the side walls 14 and 15 of the tank portion 12 and to the end wall 19 of the dip tank 17 and the end wall 24 of the sump tank 18 slightly below the tops of the walls of said tank portion by a flange or base 33. There is thereby provided a drain trough 34 surrounding said tank portion.

Extending around the interior of the enclosure 13 above the flange 33 is a cooling coil 36 for condensing solvent vapors. The coil 36 is provided with inlet and outlet lines or pipes (not shown) for circulating cold fluid therethrough. A jacket or outer casing 38 is provided around the lower portion of the enclosure walls 28, 29, 30 and 31, and beneath the base or flange 33. The casing 38 is also provided with suitable inlet and outlet pipes or lines (not shown) so that it may be used as a cooling jacket for the trough 34 and the portion of the enclosure 13 adjacent to the coil 36.

As shown in FIGURES 1 and 3, the apparatus 11 comprises, in addition to the structure above-described, a number of essentially conventional or known elements and fluid carrying or piping means. Thus, in FIGURE 1, the pump 41, filter 42 and heat exchanger 43, are shown arranged in series. The inlet of the pump 41 is connected by lines 44 and 44a, respectively, with the bottom of the sump 18 and the bottom of dip tank 17 adjacent the end wall 20 thereof. The outlet of the heat exchanger 43 is connected by lines 46 and branches 46a, 46b, and 46c thereof, to the dip tank 17 at a plurality of points on the end wall 19 of the tank.

Drain pipes 49, 49a are connected to the trough 34, adjacent the end wall 31 of the enclosure 13, and these pipes lead to a separator 50 from which lines 51 and 52 run to the sump 18 and the sewer, respectively.

The operation of the apparatus described above is relatively simple. In the first place, it must be kept in mind that the apparatus is particularly designed for improved and very efficient operation in coating processes which involve the use of hot liquid coating compositions that contain as a solvent a substantially non-flammable halogenated hydrocarbon solvent. Examples of such materials include trichloroethylene, perchloroethylene, the trichloroethanes, the tetrachloroethanes, methylene chloride, carbon tetrachloride, ethylene dichloride, ethylidene chloride, the dichlorotetrafluoroethanes, the trichlorotrifluoroethanes, the trichlorodifluoroethanes, the tetrachlorodifluoroethanes, the fluorotrichloroethanes, the fluorotetrachloroethanes, methyltrichloroethylene, 1,2-dichloropropane, 1,2 - dichloropropene, 1,1,2 - trichloropropane, ethyltrichloroethylene, mixtures thereof, as well as other halogen analogs of the above. As will be noted, these materials are generally of about 1 to 4 carbon atoms and about 1 to 6 halogen atoms. Of these, the preferred material is trichloroethylene. It should also be kept in mind that for best results, the coating composition should be maintained at a temperature which is not greatly lower than that at which the solvent boils.

In the drawings, a plurality of discs 56 are shown suspended from a conveyor (shown schematically at 57) by wires or rods 58. The coating of such discs by use of the novel apparatus of the invention is productive of excellent results. The procedure employed may be, and preferably is, as follows:

The coating composition, which may be preheated, is placed in the dip tank 17, enough being used that there is an overflow into the sump 18 over the transverse barrier 60 formed by the junction of the end walls 20 and 23 of the dip tank and the sump, respectively. The coating composition is heated to coating temperatures by circulation through the heat exchanger 43. The temperature at which the coating composition is maintained will vary according to the composition thereof and particularly in accordance with the specific solvent used. It is generally preferred to maintain the composition at a temperature only slightly below the boiling point of the solvent employed. Thus, when using a coating composition based on trichloroethylene as the solvent, the bath in the dip tank 17 will preferably be kept at about 70 to 80 degrees centigrade.

At the same time, a cooling fluid such as water is circulated by a suitable pump or pumps (not shown) through the cooling coil 36 and the casing or cooling jacket 38. By providing these cooled surfaces, solvent vapor from the coating composition is condensed. The condensed solvent drips into the trough 34 from which it flows through lines 49, 49a, to the separator 50, in which condensed water is removed from the solvent. The water is led to waste through the line 52.

The articles to be coated, in the present case discs 56, are carried forward on the conveyor 57 and are slowly lowered into the dip tank 17 where they are submerged in the coating composition held therein. During their immersion in the composition, the discs 56 are heated to approximately the temperature of the composition. Consequently, as the conveyor slowly lifts each of the discs from the bath of coating composition into the space above the bath, the solvent of the coating on the disc flashes off leaving the coating sufficiently dry that it does not drip. Since the solvent vapor from the hot, coated disc is quickly condensed on the cooling coil 36, the space above the composition in the tank 17 is kept free of solvent, thereby facilitating the flashing off of solvent from the next disc. The condensed solvent is, of course, saved so that the process is economical.

The high efficiency of the apparatus of the present invention is a result of the location of the solvent return trough 34 outwardly offset from the dip tank and sump and the provision of the cooling jacket 38 around the trough. By this construction the trough is kept cooler and evaporation or reboiling of condensed solvent is minimized or prevented.

It will be understood that the novel apparatus of the invention is adapted for use with any type of coating composition that is employed in hot dip coating. Thus, lacquer type compositions, with or without pigments, may be used which will be substantially completely dry on emersion from the coating apparatus. On the other hand, compositions, with or without pigments, may be used which require further heating for curing after the coated objects come from the coating bath. Compositions of both said types are well known and many are commercially available. Accordingly, there is no need here for specific description of compositions which may be employed in the novel apparatus herein disclosed.

It will be evident that the coating composition in the dip tank 17 will, in the absence of corrective measures, soon be unusable because of loss of solvent by evaporation. Accordingly, coating composition is continually withdrawn from the bath in the dip tank and replenished, the material fed into the tank having such proportions of ingredients and such a temperature that the composition of the bath is maintained substantially constant and the temperature of the bath is maintained in the desired range.

In actual practice fresh coating composition is continuously supplied to the dip tank 17 through the lines 46a, 46b and 46c. Aside from solvent lost through evaporation, the coating bath in the dip tank is diminished in amount by removal on the articles coated, by spilling over the barrier 60 into the sump 18, and by withdrawal through the line 44a. The solvent evaporated from the bath, as well as that evaporated from the sump and the coatings on the discs 56, is condensed on the coil 36. After separation from condensed water vapor in the separator 50, the condensed solvent is feed back in such amount as necessary to the sump 18 where it mixes with the coating composition therein and the mixture is circulated by the pump 41 through the filter 42 and heat exchanger 43 back to the dip tank. Additional non-volatile constituents may be added as required through the line 53 to the sump 18, these constituents becoming mixed with the bath as it circulates. The rate of flow of the circulating coating composition can be suitably adjusted to assist in giving the proper consistency and liquid-solids ratio to the coating composition in the tank 17.

It will be understood that there are many possible variations in the coating procedure that may be employed with apparatus of the type herein disclosed and that a number of modifications in the apparatus shown may be made without departing from the spirit of the present invention. For example, it may in some cases be desired to omit the sump tank, a large volume of coating material being withdrawn by other suitable means from the outlet end of the dip tank. Additionally, it will be appreciated that although primary reference has been made to the use of halogenated hydrocarbon solvents in the coating composition, other substantially non-flammable solvents may also be used provided they are compatible with the film-forming portion of the coating composition.

What is claimed is:

1. In dip coating apparatus of the type described, the combination of a tank member, said tank member being adapted to contain a hot, liquid, dip coating composition which includes a major proportion of a halogenated solvent, highly volatile at the temperature of said composition, an enclosure carried by said tank member and surrounding the top thereof, said enclosure including a drain trough member on the interior thereof, adjacent the top of the tank member, said drain trough member being formed on the lower portion of the enclosure and having a bottom member and inner and outer wall members, said bottom member extending outwardly from said tank member, above the level of said coating composition therein, so that the outer wall of the trough member falls in a plane exterior of the tank member and substantially all of said bottom member is exterior of said tank member, a solvent cooling coil disposed around the interior of said enclosure above said trough, whereby solvent condensed on said coil will drip into said trough, and a cooling jacket, exterior of said enclosure, surrounding the lower portion thereof and positioned so as to surround the bottom and outer wall members of said trough memebr and the peripheral area adjacent said condensing coil.

2. Dip coating apparatus as defined in claim 1 in which said tank member is elongated and adapted to be used in conjunction with a conveyor in successively coating articles.

3. Dip coating apparatus as defined in claim 1 in which said tank member comprises a dip tank and an overflow tank, arranged longitudinally in said tank member.

4. Dip coating apparatus as defined in claim 1 in which means is provided for recirculating condensed solvent from said trough.

5. Dip coating apparatus as defined in claim 1 in which means is provided for drawing off condensed solvent from said trough.

References Cited by the Examiner
UNITED STATES PATENTS

| | | | |
|---|---|---|---|
| 2,728,686 | 12/1955 | Borushko | 117—113 X |
| 2,739,567 | 3/1956 | Jones et al. | 118—429 |
| 3,042,547 | 7/1962 | Pickett | 118—61 X |

CHARLES A. WILLMUTH, *Primary Examiner.*

J. P. McINTOSH, *Assistant Examiner.*

UNITED STATES PATENT OFFICE
CERTIFICATE OF CORRECTION

Patent No. 3,292,576                December 20, 1966

Otto H. Lindemann

It is hereby certified that error appears in the above numbered patent requiring correction and that the said Letters Patent should read as corrected below.

Column 4, line 64, for "solvent cooling coil" read -- solvent condensing cooling coil --; line 70, for "trough memebr" read -- trough member --.

Signed and sealed this 28th day of Novmeber 1967.

(SEAL)
Attest:

Edward M. Fletcher, Jr.               EDWARD J. BRENNER
Attesting Officer                  Commissioner of Patents